United States Patent [19]

Harris

[11] 4,408,627

[45] Oct. 11, 1983

[54] EXHAUST BRAKE VALVE UNIT

[76] Inventor: Victor A. Harris, Llanwono Rd., Ynyshir, Porth, Mid Glamorgan, Wales

[21] Appl. No.: 874,171

[22] Filed: Feb. 1, 1978

Related U.S. Application Data

[63] Continuation-in-part of Ser. No. 575,864, May 8, 1975.

[51] Int. Cl.3 .......................... F16K 3/02; B08B 9/00

[52] U.S. Cl. ................................ 137/242; 92/130 D; 123/323; 137/315; 137/244; 188/273; 251/60; 251/63.4; 251/63.6; 251/86; 251/327; 251/329; 251/214; 251/285; 277/24; 277/62

[58] Field of Search ................ 251/60, 337, 175, 193, 251/195, 285, 326, 327, 328, 329, 63.4, 63.6, 84, 214, 86; 92/87, 85 A, 130 D, 165, 168; 15/256.5; 277/24, 62; 123/97 B, 320, 323; 137/315, 244, 242; 188/273

[56] References Cited

U.S. PATENT DOCUMENTS

| | | | |
|---|---|---|---|
| 1,284,063 | 11/1918 | Davis, Jr. et al. | 251/86 |
| 1,577,466 | 3/1926 | Hyre | 188/273 |
| 2,031,151 | 2/1936 | Eulberg | 251/326 |
| 2,853,268 | 9/1958 | Hughes | 251/285 |
| 2,896,541 | 7/1959 | Barton | 92/85 A |
| 3,042,361 | 7/1962 | Garrott | 251/327 |
| 3,111,137 | 11/1963 | Carlin | 251/327 |
| 3,290,003 | 12/1966 | Kessler | 251/63.6 |
| 3,378,224 | 4/1968 | Boyle | 251/63.6 |
| 3,463,446 | 8/1969 | Natho | 251/84 |
| 3,621,878 | 11/1971 | Smith | 137/595 |
| 3,958,592 | 5/1976 | Wells et al. | 251/63.6 |
| 4,054,156 | 10/1977 | Benson | 251/63.6 |

FOREIGN PATENT DOCUMENTS

| | | | |
|---|---|---|---|
| 864508 | 4/1961 | United Kingdom | 123/323 |
| 1380462 | 1/1975 | United Kingdom | 277/24 |

*Primary Examiner*—George L. Walton
*Attorney, Agent, or Firm*—Ladas & Parry

[57] ABSTRACT

The invention provides an automatic exhaust brake valve unit having a hollow body with an exhaust gas passage extending therethrough and a valve closure member movable in the hollow body between a closed position in which it closes the passage, and an open position in which it leaves the passage clear, the hollow body having an open end face closed by a removable plate so that the valve closure member can be removed through that end face. Such a valve unit is usable to control exhaust gas flow in either direction through the exhaust gas passage when connected in an exhaust system of a motor vehicle.

7 Claims, 5 Drawing Figures

EXHAUST BRAKE VALVE UNIT

This application is a continuation-in-part of Ser. No. 575,864, filed May 8, 1975, now abandoned.

BACKGROUND OF THE INVENTION

This invention relates to exhaust brake valve units, that is to say valve units adapted to be positioned in the exhaust system of an internal combustion engine so that on closure of the valve, back pressure to the engine is created, thus providing or enhancing engine braking when the engine is used for propelling a road vehicle. In view of the heat factor exhaust brake valve units are not precision built units but are built with fairly large tolerances between respective members to allow for expansion of those members as the valve is heated by the exhaust gas passing through the valve. It is for this reason that the exhaust brake valve unit of the present invention should not be confused with well known gate valves such as is disclosed in U.S. Pat. Nos. 2,896,541, 3,254,604, 3,290,003, and 3,378,224, which are used specifically for controlling the passage of fluid at very much lower temperatures than the temperatures of exhaust gases. In such gate valves it is essential to provide fluid type seals and consequently these valves have to be manufactured with a very high degree of precision. Because of this precise construction such gate valves could not possibly operate at the temperature of exhaust gases from an internal combustion engine. To further illustrate such precision gate valve units reference is also made to U.S. Pat. Nos. 2,457,930 to Smith, 2,853,268 to Hughes, 3,111,137 to Carlin, 3,175,473 to Boteler et al, 3,194,269 to Williams and 3,511,472 to Zimmerman. A similar gate valve is to be found also in British Pat. No. 1,380,462 to Scobel.

Exhaust brake valves are generally located in front of the muffler box of an exhaust system as close to the outlet manifold of an internal combustion engine as possible. This is necessary since otherwise if the exhaust brake valve was placed after the muffler box then the muffler would disintegrate upon operation of the exhaust valve because the baffles in the muffler box would be blown back and would block up the exhaust system whereupon pressure would build up in the muffler box and this would split open. Furthermore, exhaust brakes are generally used with the types of engine that are used in heavy commercial vehicles and because of the restricted space of the engine compartment it is difficult to locate them in the exhaust system close to the output manifold. A major problem arises when service engineers have to work on the exhaust brake. Because of the space restriction their work is hampered and effected less efficiently, causing the work to be very costly and time consuming.

Various constructions of exhaust brake valves have been proposed in the past, such designs including slide valves.

However, these existing exhaust brake valves have suffered from the disadvantage that they have to be dismantled from the exhaust system in their entirety for maintenance purposes which as previously mentioned involves considerable expense, particularly in the complex exhaust systems of modern engines.

Furthermore, known exhaust brake valve units are uni-directional, that is to say they are designed to be closable against exhaust flow in only one direction. Consequently such valves must be assembled in an exhaust system in the correct orientation giving scope for error during initial installation and subsequent maintainence.

One known exhaust brake is described and claimed in U.S. Pat. No. 1,577,466 in which there is shown an exhaust brake having a closure member movable transversely to the exhaust passage through the body of the exhaust brake. The exhaust brake body is of a two part construction in which the valve closure member is sandwiched between the two parts. The two parts are held together by bolts or screws and to repair the closure member the two parts must together be removed from the exhaust system and then separated to allow removal of the closure member. In British Patent Specification No. 864,508 there is disclosed an exhaust brake having a hollow body, a valve closure member slidable transversely to the axis of the exhaust passage through the high body and a fluid operable piston cylinder device connected with the exhaust brake body for moving the closure member. However, the body of the exhaust brake is made up of two or more parts which are held together by six bolts. This construction is somewhat similar to that disclosed in U.S. Pat. No. 1,577,466 and similarly to effect repair of the closure member it is necessary to release the exhaust brake from the exhaust system and then split the exhaust brake body.

It is among the objects of the present invention to provide an exhaust brake valve unit which alleviates the above disadvantages.

SUMMARY OF THE INVENTION

According to the present invention there is provided an automatic exhaust brake valve unit adapted to be connected into the exhaust system of a motor vehicle comprising a hollow body having an open end face and opposing planar walls defining a valve chamber therebetween which is open to said end face; said opposing walls each defining therein a port which in alignment with the port in the respective opposite wall defines an exhaust passage through the valve chamber; a valve closure member located within the valve chamber for sliding movement therein between said opposed planar walls and having opposed planar faces and a recess in each of said faces to leave a land thereon for sealing engagement with a respective one of said planar walls, the valve closure member being located in the valve chamber with a clearance fit therein and being movable in a direction transverse to the common axis of said ports between a closed position whereat exhaust gas pressure on either of said planar faces of the valve closure member is operable to urge it against the one of said planar walls on the opposite side of the valve closure member to effect sealing engagement of said one planar wall and planar face and thereby close the respective port in said one planar wall, and an open position in which the exhaust passage defined by said ports is substantially unobstructed; an end plate arranged to be mounted across said open end face of said hollow body to close the valve chamber, said end plate defining therein an aperture; a fluid pressure operated piston and cylinder device mounted on said hollow body with the piston rod thereof extending through said aperture defined in said plate and being coupled with the valve closure member, the valve closure member defining therein an axial bore for receiving said piston rod with clearance and a cross bore through the axial bore, there being a pin mounted in the piston rod and extending through said cross bore with clearance whereby universal relative movement is allowed between said piston rod and said valve closure member; and securing means located externally of said cylinder device for securing said cylinder device to said open end face of said hollow body with said end plate located between said cylinder device and said open end face of said hollow body, said cylinder device, said end plate and valve closure member being removable as a one piece assembly from said hollow means, whereby the cylinder device is movable from said valve body and the valve closure member is removable from said valve chamber through said open end face of said valve hollow body.

Therefore in contradistinction to the gate valves which are referred to above and which are operable at ambient temperatures the invention proposes an exhaust brake valve which is to be connected into an exhaust system and therefore must operate at extremely high temperatures. Consequently, it is essential that an exhaust brake constructed in accordance with the invention should have a clearance fit to allow movement of the valve closure member when the material of the exhaust brake valve has expanded as a result of the extreme heat of an exhaust gas emitted from an internal combustion engine. Because of the magnitude of the clearance fit and consequently the movability of the valve closure member under all temperature conditions the exhaust brake valve cannot be a precision valve and consequently cannot be subject to the same considerations as the precision gate valve.

Furthermore, the provision of a fluid pressure operated piston and cylinder device, and securing means which are located externally of the cylinder device to secure this device and the end plate to the open end face of the hollow body offers the particular advantage in the field of exhaust brakes that it enables the exhaust brake to be fitted into an exhaust system of an internal combustion engine so that in spite of space restrictions the exhaust brake can be dismantled easily and quickly. When it is necessary to repair the closure member, the securing means can be released and the cylinder and end plate disconnected from the valve body, whereupon the closure member can be slid out of the valve body. At no time is there a need to remove the valve body from the exhaust system and thereby there is alleviated the difficulty of re-obtaining a complete seal of the external exhaust system to the exhaust brake valve unit when it is reassembled, which difficulty is well known to motor mechanics.

The particular advantage to be gained by an exhaust brake according to the invention is that upon releasing the securing means only sufficient space is required in the restricted area of a commercial vehicle engine compartment, to allow the valve closure member to be removed from the valve body. Furthermore, the valve closure member is advantageously removed without removing the hollow body from the exhaust system. This in itself saves additional time in removing the valve body from the exhaust system and also ensures that the seal between the valve body and exhaust pipes is maintained.

The invention as set forth herein relates only to the exhaust brake art and to the solutions for overcoming particular problems which arise in this art.

Preferably in the exhaust brake valve unit of the invention, said opposing walls of the body are formed as an integral casting.

BRIEF DESCRIPTION OF THE DRAWINGS

In order to promote a fuller understanding of the above, and other, aspects of the present invention, some embodiments will now be described, by way of example only, with reference to the accompanying drawings in which.

DESCRIPTION OF PREFERRED EMBODIMENTS

Figure 1:
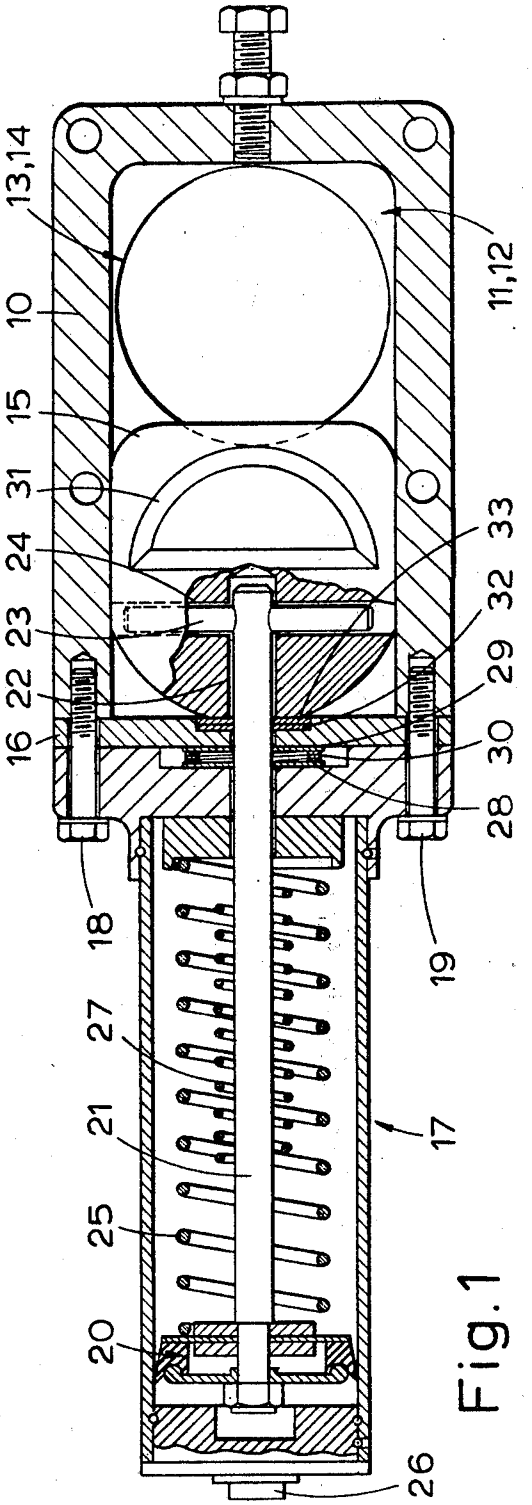
FIG. 1 shows a schematic cross-sectional view of an exhaust brake valve unit taken across the line of exhaust flow through the valve.
Figure 2:
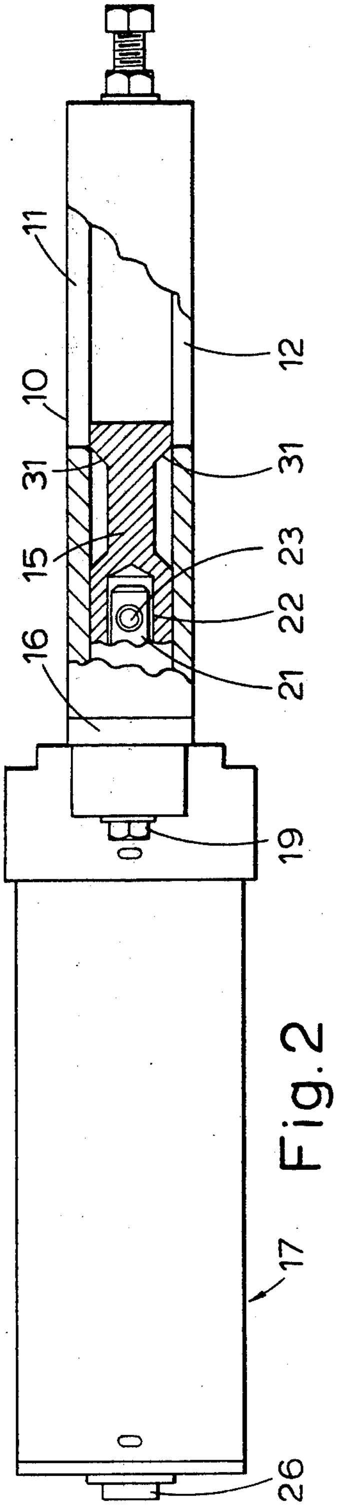
FIG. 2 shows a schematic side elevation of the valve of FIG. 1.
Figure 3:
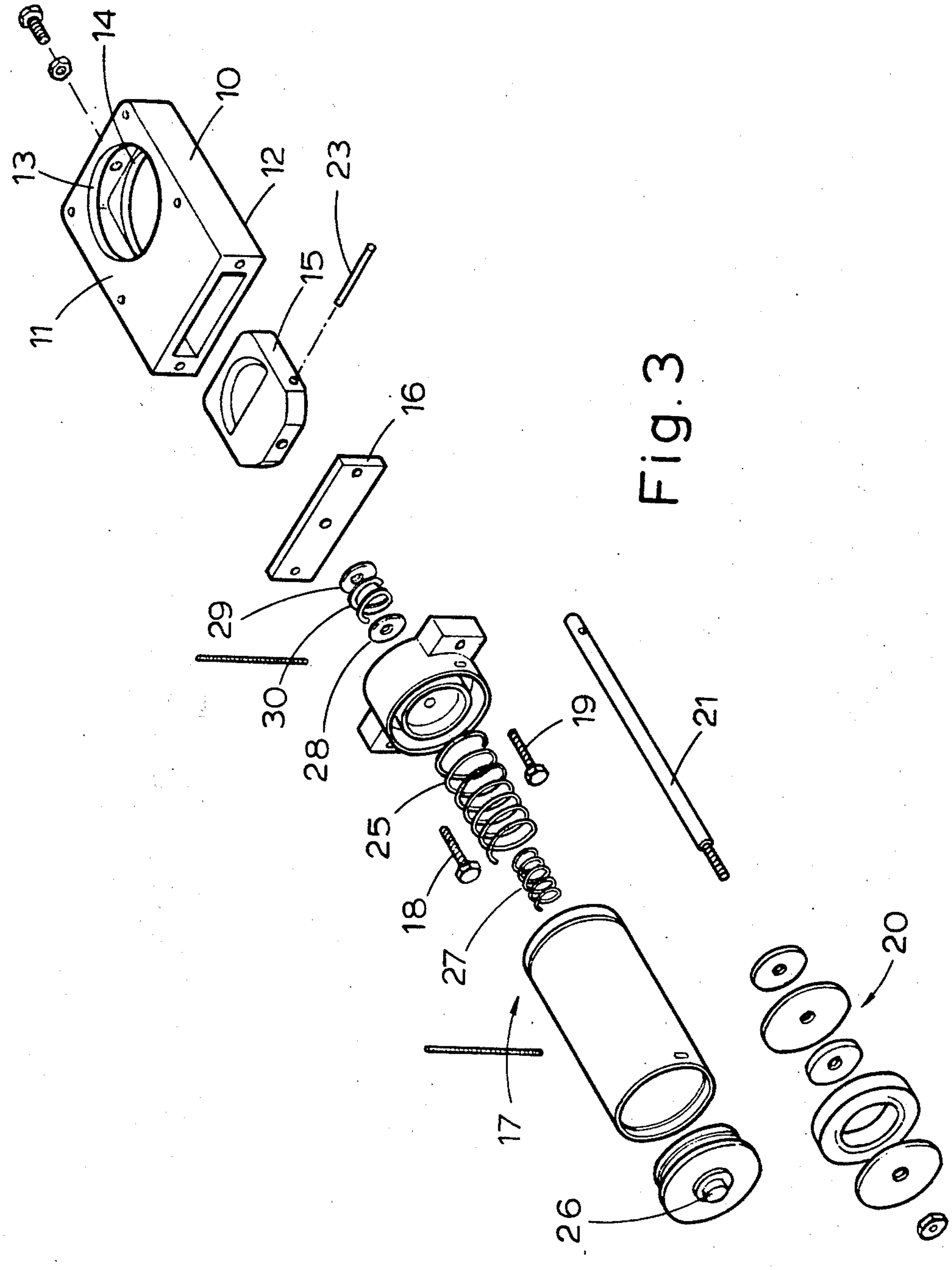
FIG. 3 shows an exploded perspective view of the valve of FIG. 1, and FIGS. 4 and 5 show similar views to FIGS. 1 and 2 of an exhaust brake valve units for cooperation with a rectangular port or pipe.

FIGS. 1, 2 and 3 show a first embodiment of the invention which is arranged for fitment in an exhaust manifold or pipe system of round cross-section.

The valve comprises a hollow body 10 which has opposing walls 11 and 12 which define a valve chamber and apertures 13 and 14 respectively in the walls 11 and 12, which define an exhaust passage through the chamber. A valve closure member 15 is loose sliding fit in the valve chamber and capable of sealing engagement with either of the walls 11 and 12, and is movable between the position shown in FIGS. 1 and 2 in which it is clear of the apertures 13 and 14 to leave the exhaust passage substantially unobstructed and a position to the right (as seen in FIGS. 1 and 2) in which it closes the apertures 13 and 14 to close the exhaust passage.

The walls 11 and 12 are adapted to be fitted, by their outside surfaces, to suitable flange joints in the exhaust system.

The valve chamber of the hollow body 10 opens to an end face of the body and is closed by a removable plate 16 which also forms an end stop for the movement of the valve closure member 15 to its open position. A single acting fluid pressure operated piston and cylinder device indicated generally at 17 is mounted by means of a flange, on the body 10 outside the plate 16, bolts 18 and 19 which are screw threaded into the body 10 serving to locate and hold the device 17 and the plate 16 on the body 10. The fluid pressure device 17 is provided with a piston 20 and a piston rod 21 which last extends through the plate 16 into a bore 22 in the valve closure member 15. The valve closure member 15 is attached to the piston rod 21 by means of a cross pin 23 which is securely fixed in the end of the piston rod 21, a cross bore 24 being provided in the valve member 15 to receive it. Both the bores 22 and 24 are a generous clearance fit over the piston rod 21 and the pin 23 respectively, and allow the valve closure member 15 to float on the piston rod 21 during motion of the member between the open and closed positions thus to allow exhaust gas pressure to drive it into sealing engagement with the inside surface of the respective wall 11 or 12. The fluid pressure device 17 also includes a return spring 25 arranged around the piston rod 21 behind the piston 20 to bias the piston and consequently the valve closure member 15 towards the open position.

Thus it can be seen that when fluid under pressure is supplied to the front face of the piston 20 by means of a port 26 the valve member 15 will be driven to the right, as see in FIGS. 1 and 2, to close the apertures 13 and 14, whereas when the pressure is released from the device 17, the valve closure member 15 will be moved back to its open position by means of the spring 25.

An auxiliary return spring 27 which is shorter than the spring 25 is provided around the piston rod 21 inside the spring 25 to be engaged and compressed against the end of the cylinder by the piston 20 over only that part of its stroke where the valve closure member approaches the closed position. Thus it can be seen that the spring 27 is only operative over that end of the stroke that closes the valve and provides additional spring force to overcome any initial resistance caused by any build up of carbon deposits on the valve at the beginning of an opening stroke.

Scraper rings 28 and 29, preferably made of nylon material, are positioned around the piston rod 21 between the plate 16 and the flanged body of the device 17, to remove any carbon deposits from the piston rod and prevent them from entering the device 17. A spring 30 is disposed between the scraper rings to keep them in position against the plate 16 and the flange of the device 17 respectively.

As an alternative to the scraper rings 28 and 29, a single scraper ring 32 may be provided. Such single scraper ring 32 is preferably positioned in a recess in the plate 16 facing the body 10, and retained therein by a washer 33 which is of sufficient diameter to abut the ends of the walls 11 and 12.

The valve closure member 15 is recessed as indicated at 31 on each face to reduce the area of valve closure member 15 which is in engagement with the inner surfaces of the walls 13 and 14. This serves to reduce the initial force necessary to open the valve after it has been closed in use for a period of time with exhaust deposits building up against the valve closure member, and also serves to provide scraping edges which give a cleaning action as the valve is operated.

Figure 4:
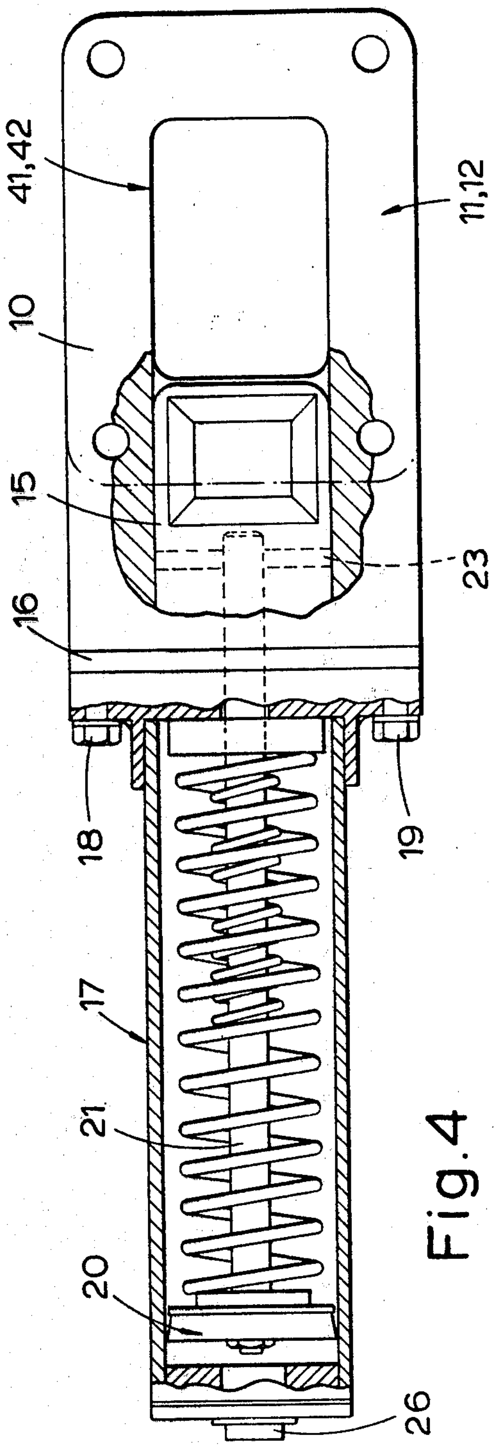
Figure 5:
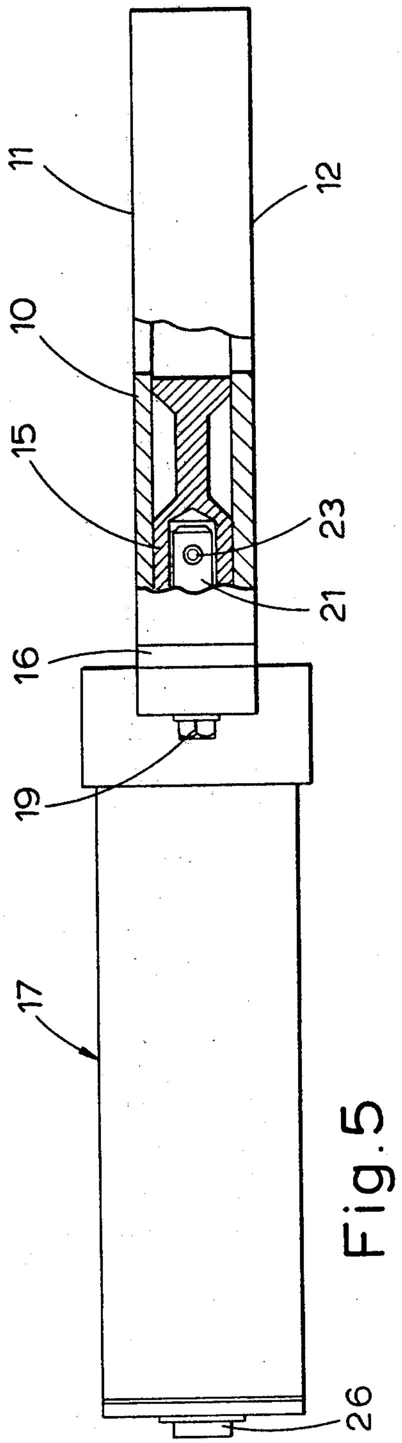

FIGS. 4 and 5 show an arrangement generally similar to that of FIGS. 1, 2 and 3 in which the apertures 11 and 12 are replaced by apertures 41 and 42 of rectangular form. The valve of FIGS. 4 and 5 is particularly adapted for cooperation with rectangular cross-section portions of an exhaust system such as may be found between a diesel engine and a turbo charger associated with that engine.

In either of the above arrangements, an adjustable abutment in the form of a set screw 43 is provided in the body to engage the valve closure member 15 in its closed position, affording some adjustment of that position. Accordingly, the valve closure member 15 may completely shut off the exhaust gas passage, or the set screw 43 can be adjusted so that in the closed position of the valve closure member 15 the exhaust passage is not completely shut off but allows some exhaust gas to flow through the valve.

It can be seen that by removing the device 17 and the plate 16 from the body of the valve in each of the embodiments, the valve closure member 15 may be extracted for servicing without disturbing the mounting of the body 10 in the exhaust system. Again it can be seen that the valve is symmetrical with the closure member 15 engaging both walls 11 and 12 and the body 10 can be inserted in the exhaust system in either orientation thus eliminating the possibility of error during installation.

I claim:

1. An automatic exhaust brake valve unit adapted to be connected into the exhaust system of a motor vehicle comprising a hollow body having an open end face and opposing planar walls defining a valve chamber therebetween which is open to said end face; said opposing walls each defining therein a port which in alignment with the port in the respective opposite wall defines an exhaust passage through the valve chamber; a valve closure member located within the valve chamber for sliding movement therein between said opposed planar walls and having opposed planar faces and a recess in each of said faces to leave a land thereon for sealing engagement with a respective one of said planar walls, the valve closure member being located in the valve chamber with a clearance fit therein and being movable in a direction transverse to the common axis of said ports between a closed position whereat exhaust gas pressure on either of said planar faces of the value closure member is operable to urge it against the one of said planar walls on the opposite side of the valve closure member to effect sealing engagement of said one planar wall and planar face and thereby close the respective port in said one planar wall, and an open position in which the exhaust passage defined by said ports is substantially unobstructed; an end plate arranged to be mounted across said open end face of said hollow body to close the valve chamber, said end plate defining therein an aperture; a fluid pressure operated piston and cylinder device mounted on said hollow body with the piston rod thereof extending through said aperture defined in said plate and being coupled with the valve closure member, the valve closure member defining therein an axial bore for receiving said piston rod with clearance and a cross bore through the axial bore, there being a pin mounted in the piston rod and extending through said cross bore with clearance whereby universal relative movement is allowed between said piston rod and said valve closure member; and securing means located externally of said cylinder device for securing said cylinder device to said open end face of said hollow body with said end plate located between said cylinder device and said open end face of said hollow body, said cylinder device, said end plate being removable from said hollow body upon releasing the securing means, whereby the cylinder device is removable from said valve body and the valve closure member is removable from said valve chamber through said open end face of said valve hollow body; and said exhaust brake valve unit further comprising scraping means disposed in a recess between said end plate and said piston and cylinder device for engagement with said piston rod, the scraping means comprising two rings having bores to closely receive the piston rod, and a coil compression spring disposed in said recess between said rings and around said piston rod to hold said rings respectively against said plate and said piston and cylinder device.

2. An exhaust brake valve unit for connection in an exhaust system of a motor vehicle to control the braking of the vehicle, said exhaust brake valve unit including a hollow body having opposed planar side walls defining a valve chamber therein open to an open end face across which is located an end plate closing the chamber, each of said opposed walls having an exhaust gas port therethrough aligned one with the other and through which exhaust gases are arranged to pass, a valve closure member having a clearance fit in said hollow body so as to be slidable therein under extreme heat conditions of the exhaust system, fluid pressure operable piston and cylinder means mounted on said hollow body having a piston rod coupled with said valve closure member for moving said closure member across said exhaust gas ports, said piston rod extending perpendicularly to the axis of the aligned ports through said open end face and end plate, securing means located externally of the fluid pressure operable piston and cylinder means for securing said piston and cylinder means to said hollow body so that upon removal of said securing means said valve closure member is removable through said open face as part of a one piece assembly comprising said closure member, said end plate and said piston and cylinder means without removal of said exhaust brake valve unit hollow body from said exhaust system and scraping means disposed in a recess between said end plate and said piston and cylinder device for engagement with said piston rod, the scraping means comprising two rings having bores to closely receive the piston rod, and a coil compression spring disposed in said recess between said rings and around said piston rod to hold said rings respectively against said plate and said piston and cylinder device.

3. An exhaust brake valve unit as claimed in claim 2, wherein said piston and cylinder device is single acting and spring biassed to move said valve closure member to said open position.

4. An exhaust brake valve unit as claimed in claim 2, wherein said piston and cylinder device is so biassed by spring means comprising a first coil compression spring operative over the whole stroke of the device, and a second coil compression spring operative over part of the stroke of the device extending from said closed position.

5. An exhaust brake valve unit as claimed in claim 2, including an adjustable abutment mounted in said hollow body to engage said valve closure member when said member is in its closed position.

6. An exhaust brake valve unit as claimed in claim 2, wherein the outside surfaces of said planar walls are adapted to receive flanged exhaust pipe connections.

7. An exhaust brake valve unit as claimed in claim 2, wherein said opposing walls of said hollow body are formed integrally as one casting.

* * * * *

UNITED STATES PATENT AND TRADEMARK OFFICE
CERTIFICATE OF CORRECTION

PATENT NO. : 4,408,627

DATED : October 11, 1983

INVENTOR(S) : John Frederick Parker

It is certified that error appears in the above-identified patent and that said Letters Patent is hereby corrected as shown below:

Pg. 1, Column 1, Item (76) which reads "-- Inventor: Victor A. Harris, Llanwono Rd., Ynyshir, Mid Glamorgan, Wales--" should read --John Frederick Parker, 15 Crescent Road, Hale, Cheshire, England--.

Signed and Sealed this

*Twenty-fourth* Day of *September 1985*

[SEAL]

*Attest:*

DONALD J. QUIGG

*Attesting Officer*

*Commissioner of Patents and Trademarks—Designate*